United States Patent [19]
Keener

[11] Patent Number: 6,038,954
[45] Date of Patent: Mar. 21, 2000

[54] PORTABLE BANDSAW SAWMILL APPARATUS

[76] Inventor: Frank Keener, 808 Dewey Ave., Mt. Vernon, Ill. 62864

[21] Appl. No.: 09/014,261

[22] Filed: Jan. 27, 1998

Related U.S. Application Data

[63] Continuation-in-part of application No. 08/668,375, Jun. 18, 1996, abandoned.

[51] Int. Cl.[7] .............................. B27B 15/02; B23D 55/00
[52] U.S. Cl. .............................. 83/795; 83/794; 83/813; 83/928; 144/378
[58] Field of Search .............................. 83/794, 795, 801, 83/813, 871, 928; 144/378, 376, 377

[56] References Cited

U.S. PATENT DOCUMENTS

| | | | |
|---|---|---|---|
| 2,722,953 | 11/1955 | Lee | 83/794 X |
| 3,115,909 | 12/1963 | McManama | 83/794 |
| 3,747,457 | 7/1973 | Thompson | 83/471.2 |
| 3,889,560 | 6/1975 | MacFadyen | 83/813 X |
| 4,111,085 | 9/1978 | Johnson | 83/813 X |
| 4,289,180 | 9/1981 | Weinzierl | 83/794 X |
| 4,559,858 | 12/1985 | Laskowski et al. | 83/794 X |
| 5,213,022 | 5/1993 | Elgan | 83/813 X |

*Primary Examiner*—Clark F. Dexter

[57] ABSTRACT

A portable bank saw sawmill which includes a specially designed tubular frame with four rigid tubular posts attaching the overhead track system to the lower deck frame. Logs are placed and secured on the lower frame, the bandsaw assembly moves longitudinally of the frame by use of the overhead track, to make successive cuts with the saw. A hydraulic motor driving a sprocket and chain turns threaded rods to raise and lower the cutting assembly from the overhead track.

4 Claims, 3 Drawing Sheets

6,038,954

PORTABLE BANDSAW SAWMILL APPARATUS

This application is a continuation in part of application Ser. No. 08/668,375 filed Jun. 18, 1996, now abandoned.

BACKGROUND OF INVENTION

This invention is an improved method that can be easily operated by one person, and can easily handle logs of different sizes and shapes. Unlike most portable mills the upper track and lower deck are of a rigid tubular material that keeps the cutting assembly in a close parallel with the lower deck, giving a faster and smoother operation.

It can easily be moved and transported without time consuming leveling and bracing. Unlike other mills where the cutting assembly is either on the side or on a lower track, this system gives free access to the deck in placing and adjusting the log, and removing the cut material.

SUMMARY OF THE INVENTION

This invention comprises a rigid base or deck of tubular or truss design with posts on each of the four corners attached to an overhead track that is suspended parallel to the lower deck. The overhead track is of a truss or tubular design so as not to sway or sag from the weight of the cutting assembly or the pressure applied when making the cut. The cutting assembly is raised and lowered by two threaded rods that are each enclosed in two telescoping tubes. One tube is attached to the trolley or bearing assembly and rides on tracks, on the top of an overhead truss, or frame system, and the other tube is attached to the cutting assembly.

The cutting assembly is moved forward and backward on the track by a hydraulic motor with sprocket and chain.

A gas engine or electric motor is engaged by a lever that slides the motor on two slide tubes, thus tightening or loosening the belts.

DESCRIPTION OF THE PREFERRED EMBODIMENT

Figure 1:
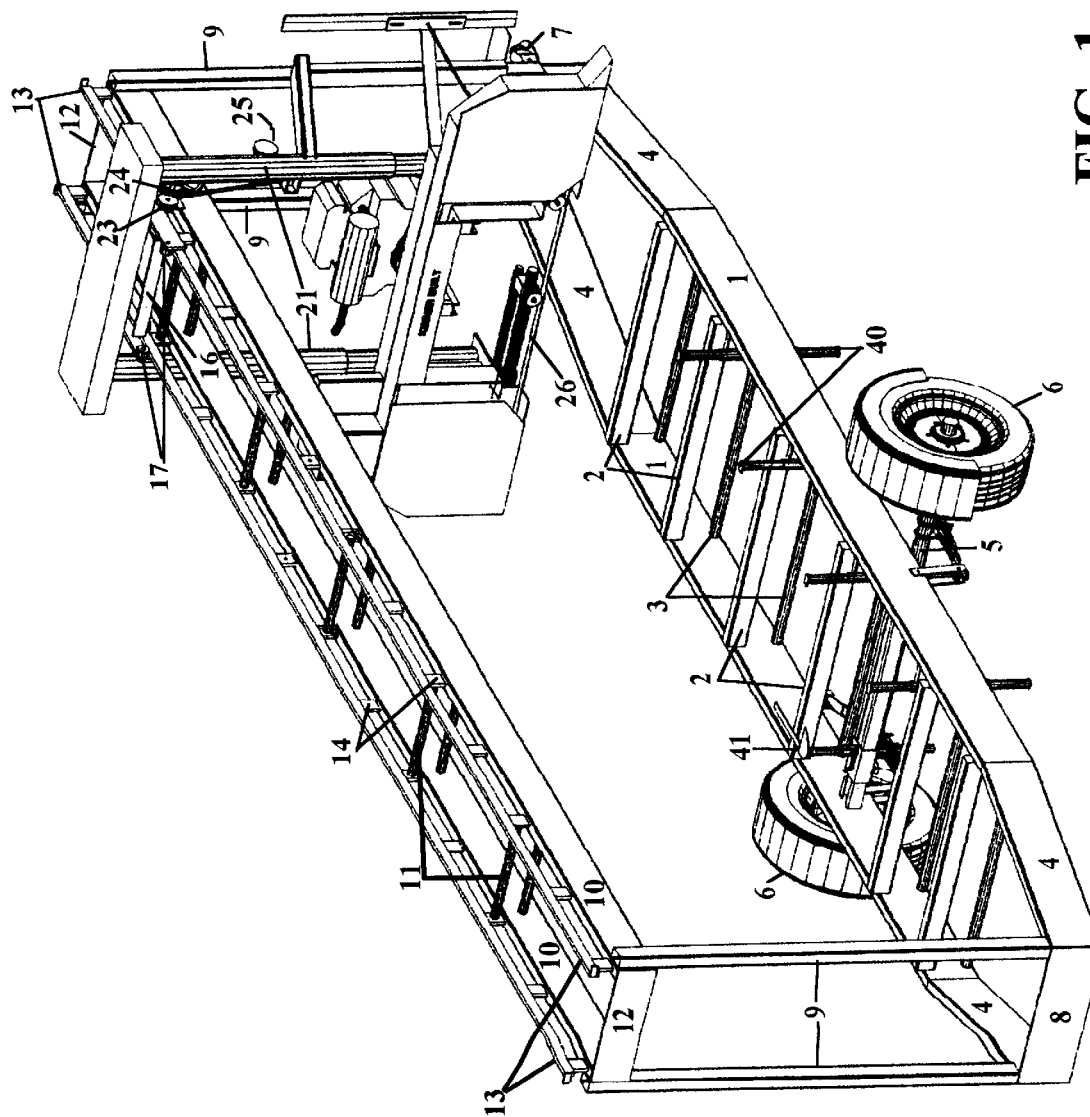
FIG. 1 is a view of the sawmill in its completed form showing the wheels and the trailer hitch.

For the purpose of promoting and understanding of the principles of the invention, reference will now be made to the embodiment illustrated in the drawings. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to the drawings: in detail. FIG. 1 The lower deck frame or base frame 100 is constructed by using two tubular steel beams 1, four tubular steel angled beams 4 with the cross braces of tubular steel 2 and 3 that are welded to the tubular steel beams 1. At each end of the main support beams 1 are the tubular support beams 4 which are angled inward to produce a narrower width to support the tubular posts 9 for the overhead track. The frame is of necessary strength to support the weight of a large log and of length to support logs of varying lengths, plus additional length for the blade to enter the log at one end and to emerge from the log at the other end.

Attached to the base frame 100 is an axle 5 and wheel assembly 6 for transporting the machine for portable use. A trailer hitch 7 is attached to one of the steel plates 8 which are welded to the angled beams 4 at the two ends of the main frame 100 to tie the frame together and support the four posts 9 that are also welded to an overhead track frame 60.

The overhead track frame 60 is constructed of tubular steel side support rails 10 and tubular steel cross braces 11. A steel plate 12 is attached to the ends of the rails 10 and welded to the four support posts 9 to hold the frame system in a rigid position.

Figure 4:
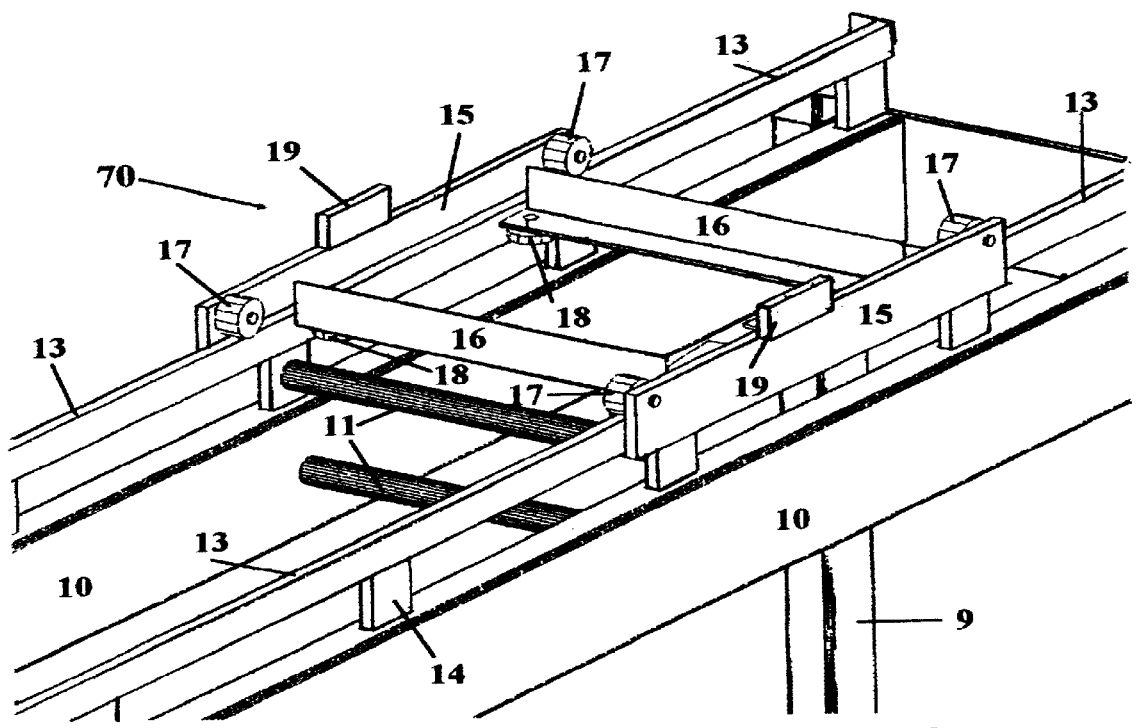
FIG. 4 is a view of the carriage that rides on the top of the two tracks, the carriage moves on the tracks and supports the cutting assembly.

Two tracks 13 of flat bar steel are attached to the two support rails 10 by flat bar steel spacers 14 so that a carriage assembly FIG. 4 can roll freely the full length of the tracks.

The carriage assembly 70 shown in FIG. 4 is constructed of two side rails 15 of flat bar steel and cross braces 16 of steel angle iron which are welded to the two side rails 15. Four rollers 17 are attached to the side rails 15 and roll on the top edge of the two tracks 13. Four rollers 18, FIG. 4 are attached to the two steel angles 16 and roll against the inside of the two tracks 13 to keep the assembly in the proper position on the tracks.

Figure 5:
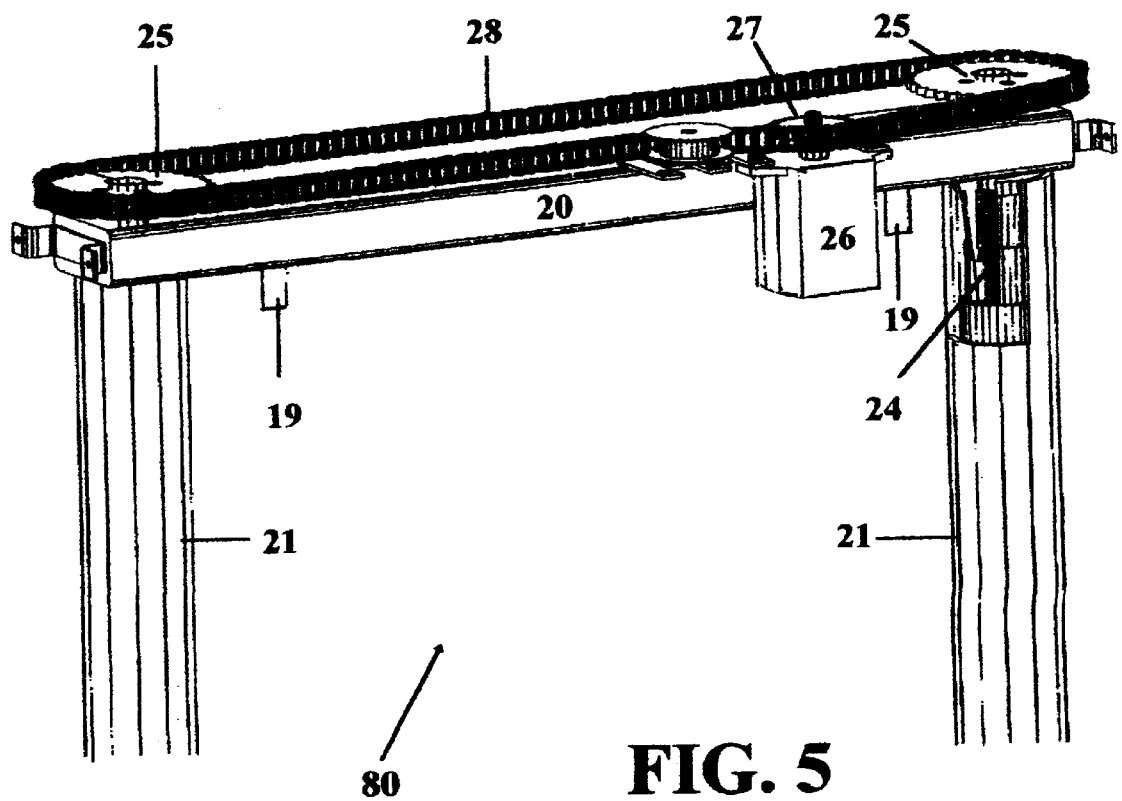
FIG. 5 is a view of the hydraulic motor and chain that turns the Acme screws inside the telescoping tubes which raise and lower the cutting assembly.

The carriage assembly 70 is attached to the raising and lowering assembly 80 by two flat bar steel spacers 19, also shown in FIG. 5 to the tubular steel support 20.

Figure 3:
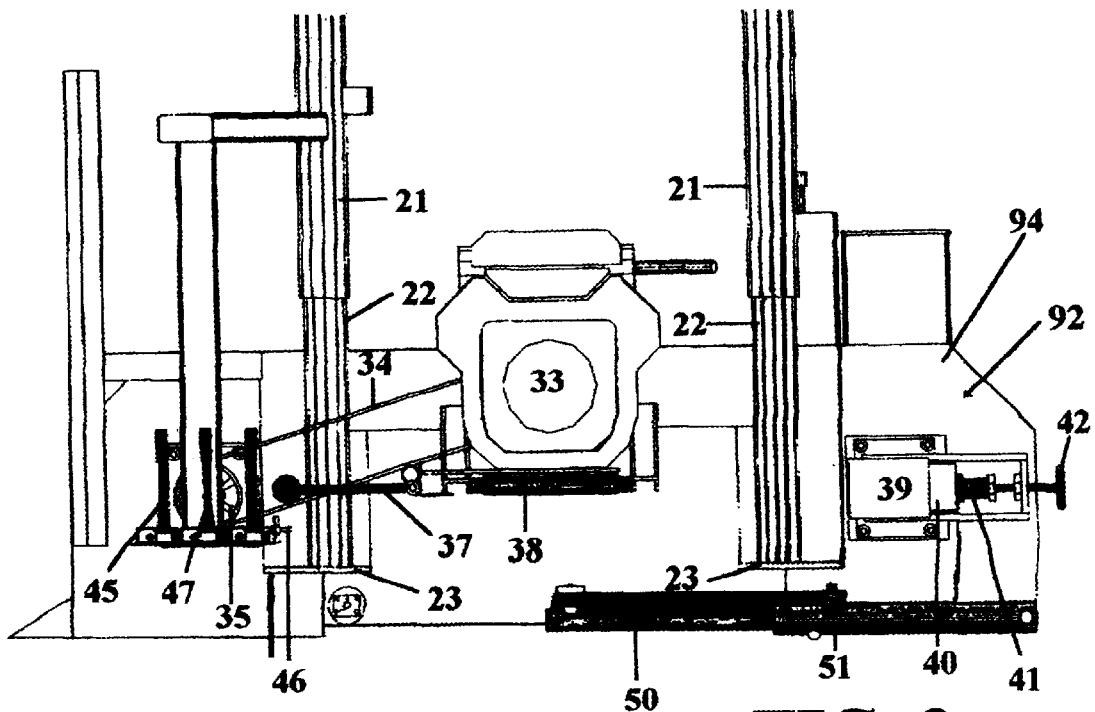
FIG. 3 is a view of the operator side of the machine, showing the hydraulic control levers. The levers engage the belt drive from the engine or motor to the blade wheels, and the blade tension adjustment. Also shown are the telescoping tubes for raising and lowering the cutting assembly.

The telescoping tubes 21 & 22 FIG. 3 & FIG. 5 are respectively fastened to the tubular steel, above the top tracks, and to a steel plate 23, FIG. 3 which is attached to the cutting assembly. The outer tube 21 is welded to tubular steel support 20 and the inner tube 22 to steel plate 23.

Figure 2:
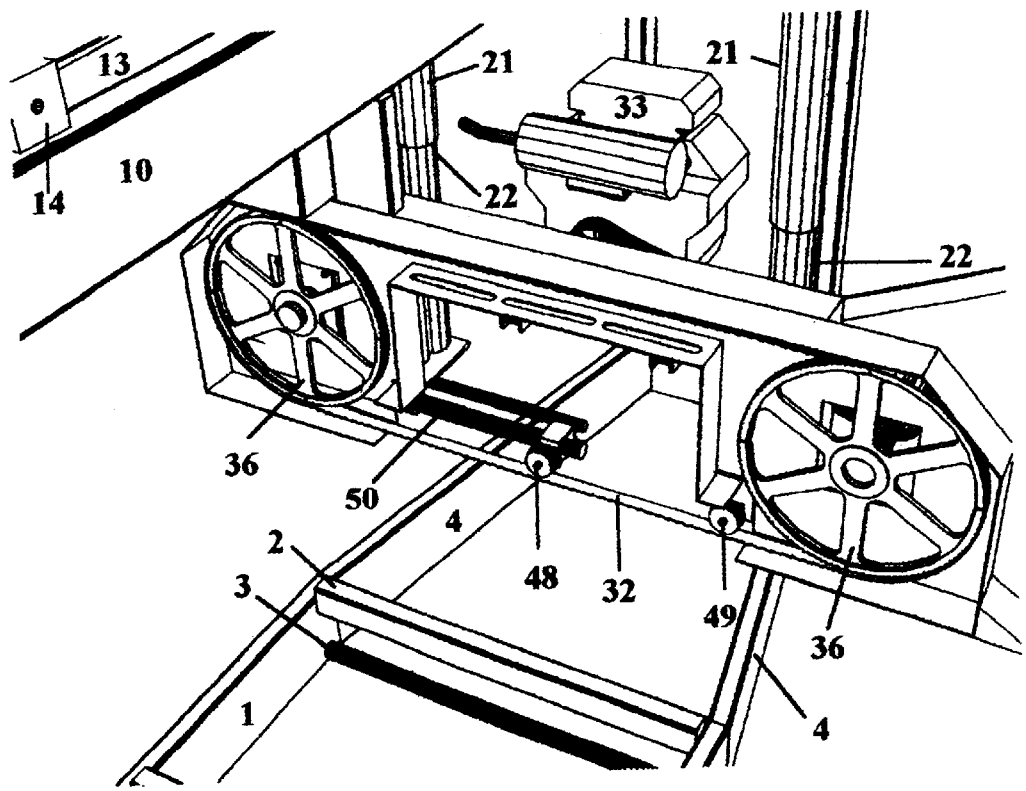
FIG. 2 is a view of the band saw blade, the blade supporting wheels, and the blade rollers that keep the blade in the proper cutting position.

The cutting assembly 90 FIG. 1, FIG. 2 & FIG. 3 is raised and lowered by an Acme screw 24, FIG. 5 the lower end of which is threadably attached to an Acme screw nut which is attached to the top of the inner tube 22, and the upper end of which is welded to sprocket 25, FIG. 5. The sprockets 25 are rotated to turn the screws by a hydraulic motor 26, drive sprocket 27, and chain 28.

The carriage assembly 70 is moved on the tracks 13 by a chain (not shown), FIG. 1 and the sprocket 29 which is attached to a pulley and V-belt assembly 30 and is powered by a hydraulic motor 31. The carriage is moved the length of the tracks as necessary for the bandsaw cutting assembly FIG. 1 & FIG. 2 to allow the blade to enter the log at one end and to emerge from the log at the opposite end.

The cutting assembly 90 includes a frame 94 and is powered by a gas or diesel engine, or electric motor 33 and is attached FIG. 3 by V-belts 34 to a pulley 35 that turns the band saw blade wheels 36, FIG. 2. The engine or motor FIG. 3 is engaged by lever 37 which moves the motor on sliding tubes 38, to tighten or loosen the belts.

Tension is applied to the band saw blade 32 by a blade tensioning device 92 which includes square tube 39, FIG. 3 over a square tube 40 and a tensioning spring 41 and threaded retainer screws 42.

When operating the machine FIG. 1, a log is placed on the tubular cross bars 2 and rolled against the telescoping tubular stops 43 and held in place by the adjustable log holder 44.

The hydraulic valve 45, FIG. 3 is used to engage the hydraulic motor 31, FIG. 1 which turns sprocket 29, and pulls the overhead carriage and attached cutting assembly by the chain (not shown), to position the bandsaw blade at one end of the log and pull the cutting assembly blade through the log to the other end in the sawing process.

Hydraulic valve 46, FIG. 3 is used to adjust the cutting speed by controlling the flow of fluid to the hydraulic motor 31, FIG. 1. Hydraulic valve 47, FIG. 3 is use to engage the hydraulic motor 26, FIG. 5 and sprocket 27, which turns chain 28, and rotates sprockets 25, attached to threaded screw 24 to raise and lower the cutting assembly.

A set of blade guide wheels 48 & 49, FIG. 2 are used to stabilize the blade 32. One guide wheel 49 is a stationary guide wheel and the other guide wheel 48 is attached to a hydraulic cylinder rod 50, and cylinder 51, FIG. 3 to move the guide wheel the proper distance to the log or lumber being cut. An electric gear motor may also be used for this purpose.

What I claim is:

1. A portable bandsaw sawmill apparatus comprising:
   a base extending generally horizontally and having a length, said base including a plurality of beams forming the periphery of said base, wherein at least two of the beams extend longitudinally along the length of the base, said base including cross braces extending between and connected to the longitudinally extending beams;
   a plurality of wheels mounted to said base, at least a portion of each wheel being disposed below said base for transporting said bandsaw sawmill apparatus;
   a plurality of posts, each post mounted on said base and extending generally vertically therefrom;
   an overhead track frame fixedly supported by said posts at a fixed distance above said base, said track frame including a pair of longitudinally extending support rails each supporting a track, the tracks extending generally horizontally along the length of said base, and the track frame further including cross braces extending between and connected to said support rails;
   a carriage assembly movably mounted on said tracks to move along the length of said base;
   a cutting assembly disposed between said base and said overhead track frame, said cutting assembly including:
      a saw frame,
      a pair of blade support wheels mounted on said saw frame and horizontally spaced from one another,
      a bandsaw blade mounted on said support wheels, said bandsaw blade including a cutting portion extending generally horizontally between said wheels, wherein said cutting portion extends in a direction generally transverse to the length of said base, and
      bandsaw drive means for driving one of said support wheels to move said bandsaw blade;
   a raising and lowering assembly for raising and lowering said cutting assembly with respect to said base, said raising and lowering assembly including:
      a cross member mounted on said carriage assembly,
      at least two vertically extending tube assemblies, wherein said tube assemblies each include a pair of telescoping tubes, a first tube of each of said pairs of telescoping tubes being mounted to said cross member and extending downwardly therefrom and a second tube of each of said pairs of telescoping tubes being connected to said cutting assembly, and
      a means for extending and retracting said pairs of telescoping tubes;
   wherein said carriage assembly includes a carriage frame, a plurality of vertically oriented rollers mounted on said carriage frame and contacting a top surface of a respective one of said tracks, and a plurality of horizontally oriented rollers mounted on said carriage frame and contacting a side surface of a respective one of said tracks;
   wherein said means for extending and retracting said pairs of telescoping tubes includes a screw mechanism connected to each of said second tubes, a sprocket connected to each of said screw mechanisms, a chain operably connected to each of said sprockets, and a motor having a drive sprocket driving said chain to turn said sprockets to extend and retract said pairs of telescoping tubes;
   wherein said bandsaw drive means includes a driven pulley connected to said one support wheel, and a motor mounted to said saw frame and having a drive pulley, wherein said drive pulley is connected to said driven pulley by an endless driving member;
   whereby said cutting assembly is movable horizontally along the length of said base to cut through a workpiece supported on said base, and movable vertically to cut workpieces of different thicknesses.

2. The portable bandsaw sawmill apparatus of claim 1, wherein said beams, said posts and said support rails are tubular.

3. The portable bandsaw sawmill apparatus of claim 2, wherein said endless driving member is a V-belt.

4. The portable bandsaw sawmill apparatus of claim 3, wherein a trailer hitch is attached to said base.

* * * * *